No. 639,090. Patented Dec. 12, 1899.
J. POWELL, D. COLVILLE, Jr., J. JARDINE & T. B. MACKENZIE.
APPARATUS FOR CHARGING MATERIALS INTO OPEN HEARTH STEEL MELTING FURNACES.
(Application filed Nov. 11, 1898.)

(No Model.) 2 Sheets—Sheet 1.

WITNESSES:
F. W. Wright
S. C. Connor

INVENTORS
JAMES POWELL
DAVID COLVILLE, JR.
JOHN JARDINE
THOMAS BROWN MACKENZIE
BY Howsen and Howsen
THEIR ATTORNEYS.

No. 639,090. Patented Dec. 12, 1899.
J. POWELL, D. COLVILLE, Jr., J. JARDINE & T. B. MACKENZIE.
APPARATUS FOR CHARGING MATERIALS INTO OPEN HEARTH STEEL MELTING FURNACES.
(Application filed Nov. 11, 1898.)

(No Model.) 2 Sheets—Sheet 2.

WITNESSES:
F. W. Wright
S. C. Connor

INVENTORS
JAMES POWELL
DAVID COLVILLE, JR.
JOHN JARDINE
THOMAS BROWN MACKENZIE
BY Howson and Howson
THEIR ATTORNEYS.

UNITED STATES PATENT OFFICE.

JAMES POWELL, DAVID COLVILLE, JR., JOHN JARDINE, AND THOMAS BROWN MACKENZIE, OF MOTHERWELL, SCOTLAND.

APPARATUS FOR CHARGING MATERIALS INTO OPEN-HEARTH STEEL-MELTING FURNACES.

SPECIFICATION forming part of Letters Patent No. 639,090, dated December 12, 1899.

Application filed November 11, 1898. Serial No. 696,147. (No model.)

*To all whom it may concern:*

Be it known that we, JAMES POWELL, DAVID COLVILLE, Jr., JOHN JARDINE, and THOMAS BROWN MACKENZIE, subjects of the Queen of Great Britain and Ireland, and residents of Motherwell, in the county of Lanark, Scotland, have invented certain Improvements in Apparatus for Charging Materials into Open-Hearth Steel-Melting Furnaces, (for which we have applied for a British patent, No. 9,024, dated April 19, 1898,) of which the following is a specification.

The said invention has for its object to save time and labor in charging materials into steel making or melting furnaces.

The improved apparatus consists, essentially, of an endless traveling band of suitable width, which may be of metal links or of canvas covered with protecting steel plates or other suitable material, this band passing around carrying rollers or drums held in a frame having an inclined guide at one end, down which the materials pass onto the band. The band is driven by a motor at such a speed that on reaching the part of the band opposite the furnace-front the materials will be thrown off the band and through the opening or door into the furnace. Adjustable guides on the frame may be used to assist in spreading the materials over the bed of the furnace. The apparatus is mounted on a carriage which can be moved along the melting-shop.

The improved apparatus is shown on two accompanying sheets of explanatory drawings.

Figure 1:
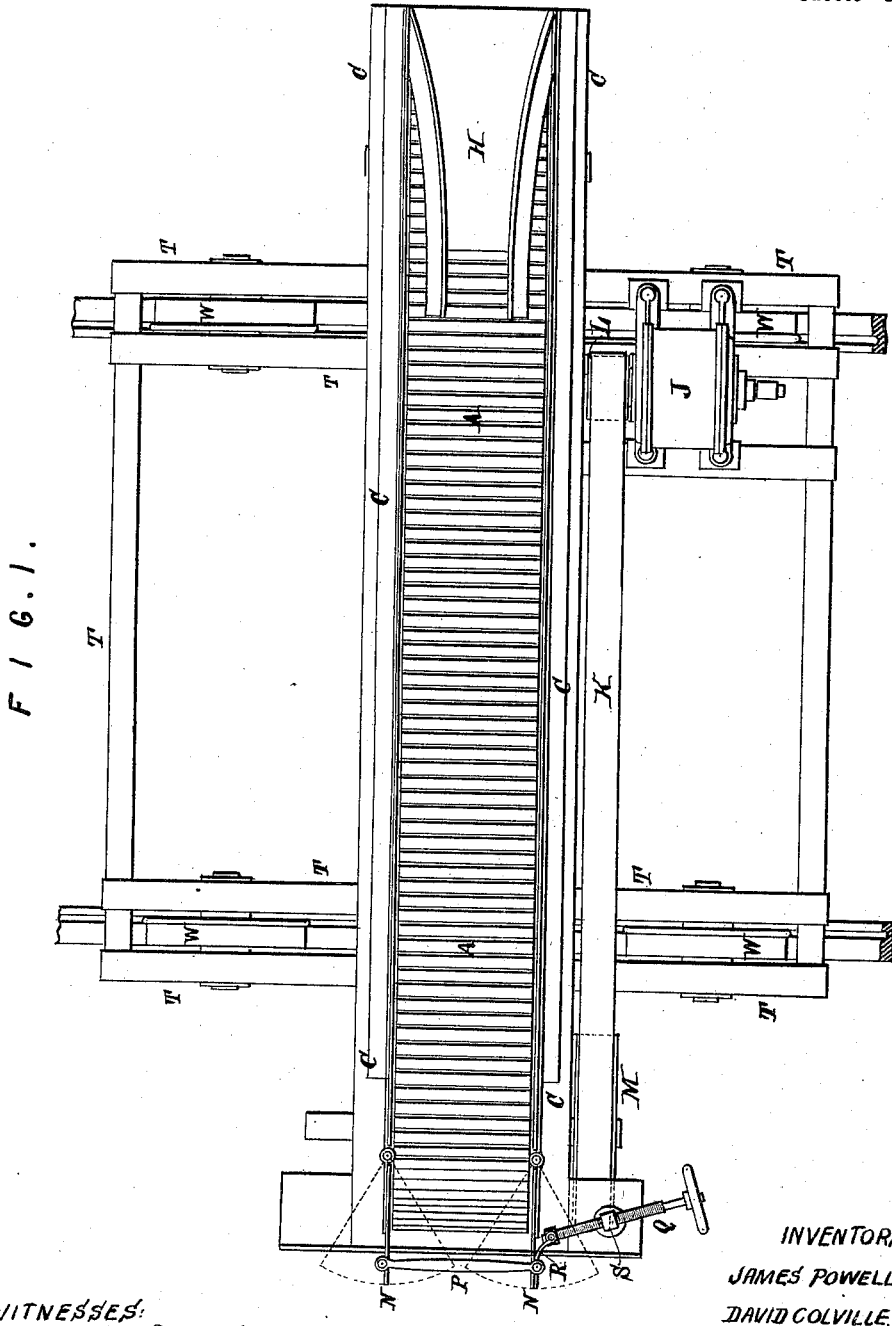
Figure 2:
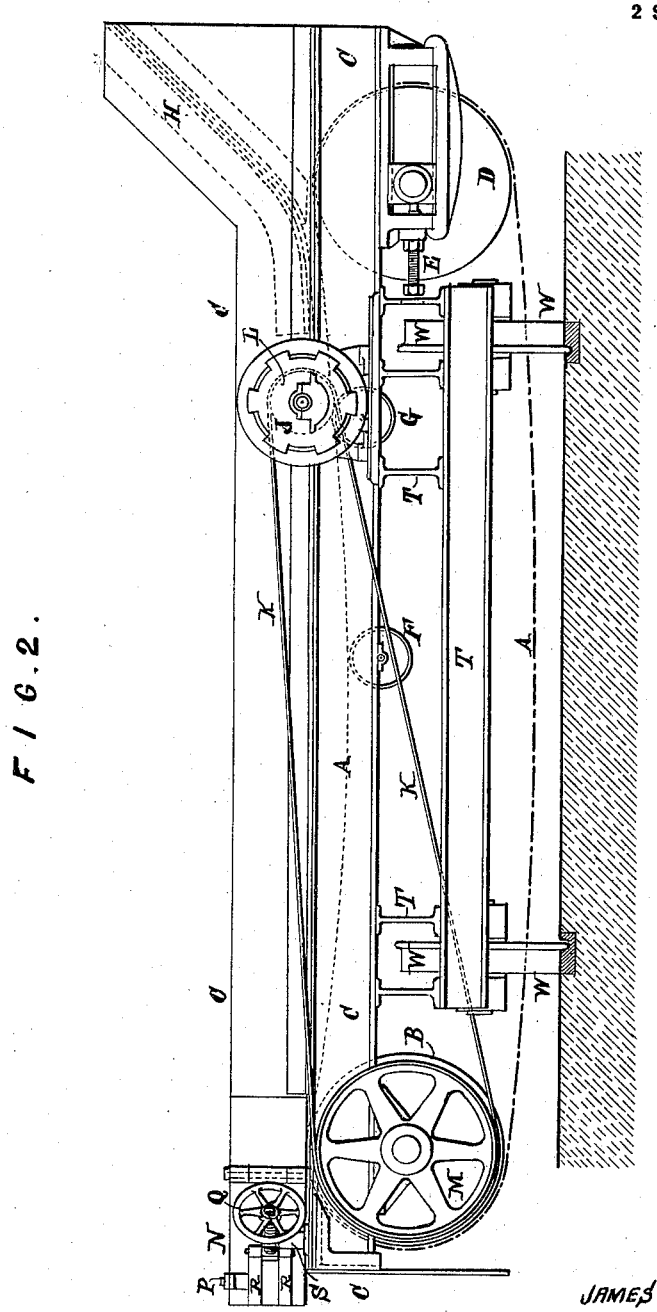

Figure 1 is a plan, and Fig. 2 a side elevation.

As shown in the drawings, there is provided an endless traveling band A, by preference of canvas covered with metal plates. This band passes around a roller or drum B, held in bearings in one end of a frame C, this end of the frame being opposite the doors or openings in the furnace. (Not shown.) The band A extends to and around a second roller or drum D, held in bearings in the opposite end of the frame C, which may be of any desired length, so that its outer end is convenient to where the materials are brought into the melting-shop. The bearings of the drum D are adjustable by screwed spindles E, so that the position of the drum D can be adjusted to put any desired tension on the band A, and the band when of considerable length may be supported at intermediate points on rollers F G, Fig. 2. The frame C is made with an inclined guide H, and the materials, of a size which will pass through the opening or door in the furnace, are thrown on the outer upper end of this guide, down which they pass onto the traveling band A. The band is driven by an electric motor J (shown in diagram in the drawings) through a belt K passing around a pulley L on the motor to a pulley M on the axle of the drum B, the band being made to travel at such a speed that the materials on reaching the drum B will be thrown off the band and through the opening or door into the furnace. Any other suitable motor or engine may be substituted for the electric motor. A pair of guides N are hinged at the furnace end of the frame C. These guides may be connected together by a link P and are capable of movement through the angles (indicated by the dotted lines in Fig. 1) by suitably adjusting the screwed spindle Q, connected to one of the guides N by a blade-spring R, the eye S, through which the spindle Q screws, being itself capable of rotation.

The adjustment of the guides N, as described, assists in spreading the materials over the bed of the furnace by giving direction to the pieces just as they pass off the band.

The apparatus is mounted on a carriage or truck T, running on wheels W, so that it can be moved along the melting-shop to bring the band A in succession opposite the doors or openings of the several furnaces.

What we claim as our invention is—

Apparatus for charging materials into open-hearth steel-melting furnaces, having in combination an endless traveling band passing around drums carried in a frame, an inclined guide at one end of the frame and adjustable guides at the other, a motor for driving the band, and a truck or carriage for carrying the apparatus substantially as herein set forth.

In testimony whereof we have signed our names to this specification in the presence of two subscribing witnesses.

JAMES POWELL.
  DAVID COLVILLE, JR.
  JOHN JARDINE.
  THOMAS BROWN MACKENZIE.

Witnesses:
  WILLIAM HAMILTON ARNOTT,
  WILLIAM WATSON.